Aug. 18, 1936.  L. GILGENBACH  2,051,699
SEEDER MACHINE
Filed April 2, 1935   2 Sheets-Sheet 2
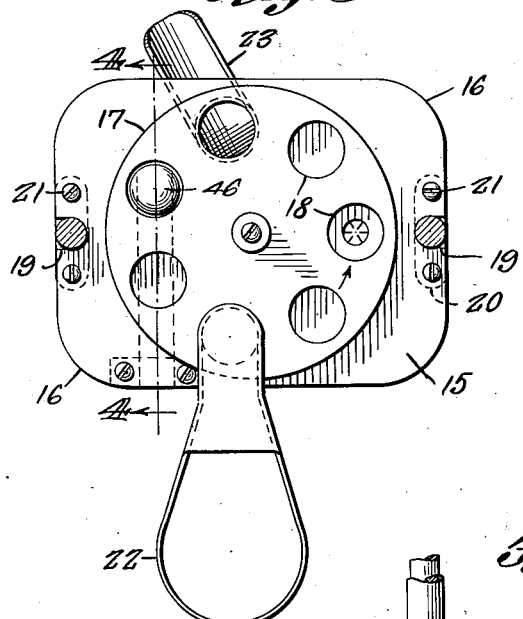
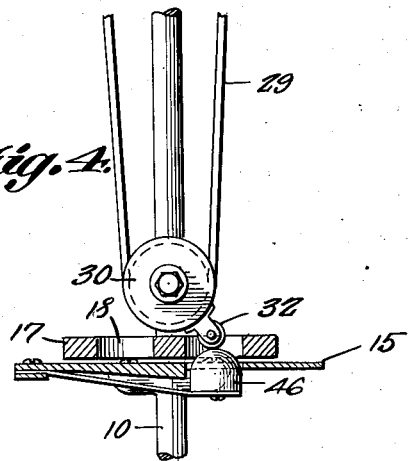
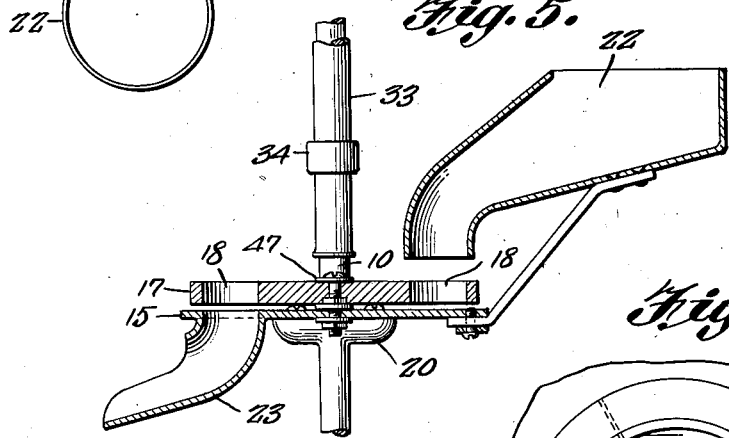
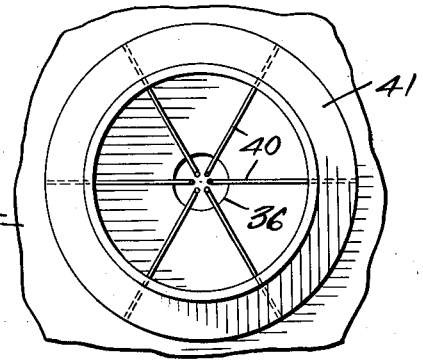
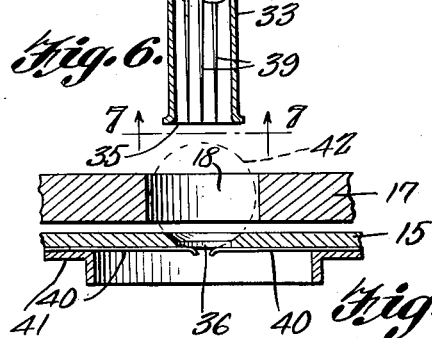
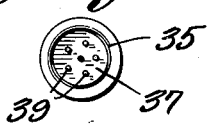
Leo Gilgenbach, INVENTOR Patented Aug. 18, 1936

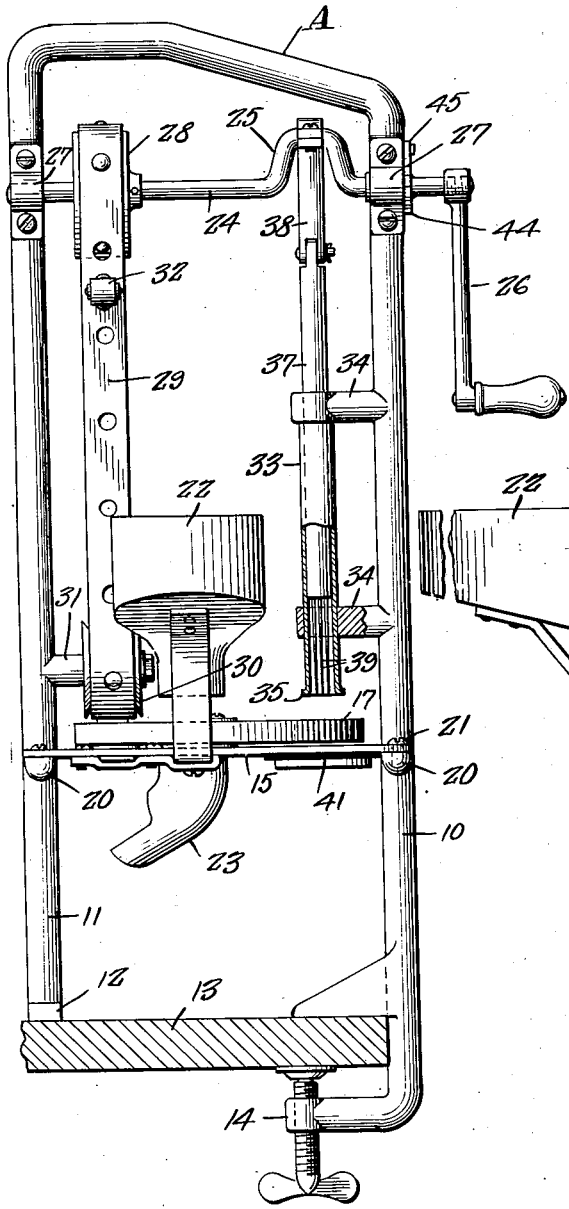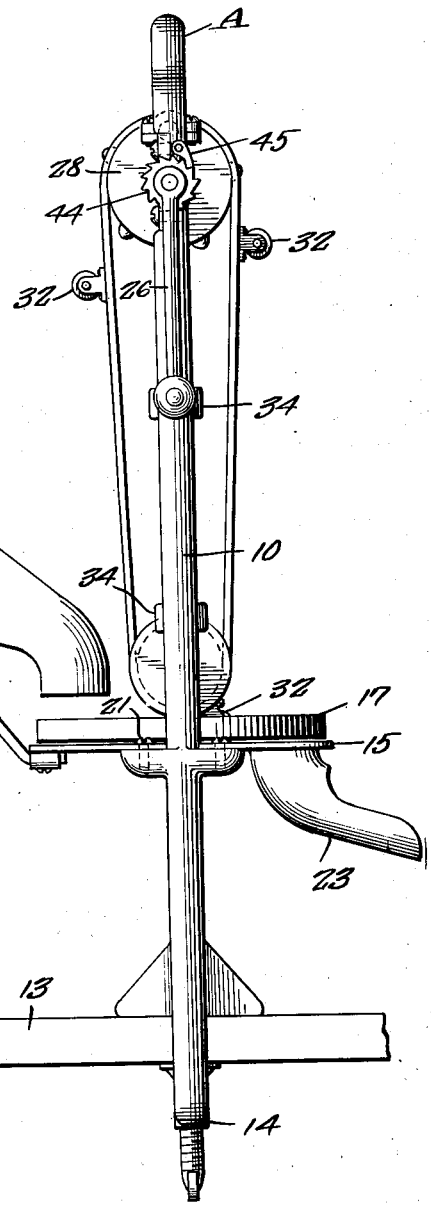

2,051,699

UNITED STATES PATENT OFFICE 2,051,699

SEEDER MACHINE

Leo Gilgenbach, Malone, Wis.

Application April 2, 1935, Serial No. 14,331

1 Claim. (Cl. 146—20)

The invention relates to a fruit seeding machine and more especially to cherry pitters.

The primary object of the invention is the provision of a machine of this character, wherein fruit to be seeded, as for example, cherries, will be fed into the machine and the seeds automatically removed and the seeded fruit conveniently delivered from said machine, the operation of the machine being continuous and automatic excepting that the machine is hand driven.

Another object of the invention is the provision of a machine of this character, wherein the feed table for the fruit is turned in a normal manner so that in single order the cherries can be pitted and delivered from the machine, the parts and assembly of the machine being novel.

A further object of the invention is the provision of a machine of this character, wherein the turn table or carrier for the fruit is of dial character and the fruit to be pitted or seeded will be singly delivered and singly discharged as well as singly pitted or seeded.

A still further object of the invention is the provision of a machine of this character, which is simple in construction, thoroughly reliable and efficient in its operation, easy to handle, readily portable, requiring no skill in the working thereof, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereinto appended.

In the accompanying drawings:

Figure 1 is a fragmentary vertical sectional view through a support showing the machine constructed in accordance with the invention carried thereby and partly in section.

Figure 2 is a side elevation.

Figure 3 is a plan view of the turn table showing adjuncts in transverse section.

Figure 4 is a fragmentary vertical sectional view taken on the line 4—4 of Figure 3.

Figure 5 is a fragmentary vertical sectional view showing the feed hopper and discharge spout.

Figure 6 is a fragmentary vertical sectional view through the turn table with the pitting plunger associated therewith.

Figure 7 is a view taken on the line 7—7 of Figure 6.

Figure 8 is a fragmentary enlarged detailed plan view of the seed extracting opening looking toward the bottom of the turn table bed.

Similar reference characters indicate corresponding parts throughout the several views in the drawings.

Referring to the drawings in detail, the machine comprises a vertical frame A having the parallel side uprights 10 and 11, respectively, the upright 11 being formed with a foot 12 to rest upon the top of a table or other support, a portion being indicated at 13, while the upright 10 is provided with a clamp 14 to permit the fastening of the frame in vertical position upon this support.

Carried within the frame is a substantially rectangular shaped bed 15, preferably having the rounded corners 16 and this bed is horizontally arranged. Journaled centrally of the bed 15 and superposed with relation thereto is a turn table or dial 17 having formed therein concentrically of its center close to the marginal or peripheral edge of the same circular hobs or openings 18, these being uniformly spaced apart with relation to each other and constitute pockets for accommodating fruit to be seeded or pitted, as for example, cherries. The bed 15 at opposite ends is notched as at 19 to accommodate the uprights 10 and 11 of the frame and said bed is supported on hangers 20 therefor and made secure by fasteners 21 thereto.

Connected to the bed 15 at one side thereof is a feed or delivery hopper 22 in which is placed the fruit for the conveyance thereof singly in successive order into a pocket 18 in the turn table 17 while at the other side of the said bed directly opposite the hopper 22 is a discharge spout 23 for dispensing the seeded or pitted fruit from the machine into any suitable receiver or receptacle.

At the desired or selected elevation in the frame A is journaled a horizontally disposed crank shaft 24 its crank being indicated at 25 and this shaft has detachably connected thereto a handle 26 for manual rotation thereof. The shaft is journaled in suitable bearings 27 equipped with the frame A. Fixed on the shaft 24 is a sprocket wheel 28 having trained thereover the belt-like endless driving medium 29 which is also trained over an idle sprocket wheel 30 journaled on a stud axle 31 equipped with the frame A. The medium 29 has fitted therewith a tripping roller 32 equipped with a suitable resilient tread and this roller intermittently engages in a hole 18 in the turn table 17 for the turning thereof in a step by step manner and at determined intervals.

Arranged parallel with and spaced from the upright 10 of the frame A is a guide barrel 33 stationarily held by brackets 34 integral with the upright 10 and the lower open end 35 of this barrel is in confronting relation to a pitting aperture 36 provided in the bed 15 and with which successively registers the holes 18 in the turn table 17 on the turning thereof. Slidably telescoped in the barrel 33 is a pitting plunger 37 which through a pivotal link 38 is connected with the crank 25 of the shaft 24 to be reciprocated thereby. This plunger 37 at its lower working end carries pitting needles 39 for engaging the fruit to be pitted or seeded on the down stroke of such plunger.

Beneath the aperture 36 in the bed 15 and directed toward the center of the latter are radially disposed resilient fingers 40, these being carried by a ring 41 made secure to the under face of the bed and concentric with respect to the said aperture or hole 36 the fingers being adapted for cooperation with the needles 39 so that when a cherry as at 42 is attacked by the needles 39 the seed will be extracted from this cherry and the seedless cherry under the tension of the fingers 36 will be caused to become forked by the needles 39 and lifted until unforked by the mouth rim 43 of the barrel 33 so that it will be freed within the pocket advancing the same to the seeding or pitting point by the turn table 17 and thus in this freed condition delivered to the discharge spout 23 for the dispensing of the seeded or pitted cherry from the machine. The fingers 40 prevent the fruit from being ejected through the hole or aperture 36 but permits the seed to be ejected therethrough.

The shaft 24 carries a ratchet wheel 44 with which coacts a ratchet pawl 45 on the frame A so that the turn table 17 will operate in one direction and be locked against retrograde movement.

Carried beneath the bed 15 is a spring acting releasable keeper 46 which plays through a suitable clearance in the bed 15 to engage with an opening 18 in the turn table 17 so as to latch the said turn table and this keeper 46 is automatically retreated from the opening 18 by the trip roller 32 so that the latter can turn the table at determined intervals and under this set of the turn table cherries to be pitted or seeded will be successively fed into this position in single order automatically in the operation of the machine.

The turn table rotates on an arbor 47 which is engaged with the bed 15.

In the operation of the machine the fruit is delivered from the hopper 22 singly in the holes 18 on the turning of the turn table 17 which latter turns in a direction to present the cherries in single order to the needles 39 of the plunger 37 and in this manner the cherries are seeded or pitted and thereafter the seedless or pitted cherries are conveyed to the spout 23 for the dispensing of such cherries.

It is to be understood that the ratchet wheel 44 and pawl 45 coacting therewith can be dispensed with for controlling the operation of the shaft 23 in the proper direction as the handle 26 may be threaded to the said shaft so that when turned back this handle will turn off of the shaft and thus prevent the operation of the machine in the wrong direction.

What is claimed is:

In a fruit pitting machine, a frame having a stationary bed plate thereon, a turn table centrally pivoted on the bed plate and having an annular series of round fruit receiving holes, said bed plate having an opening in a line with one of the holes and flat spring elements carried by the bed plate for partly closing the opening, a spring fixed to the bed plate and having a knob end to be received in one of the openings of the table providing a holding or releasing keeper for the turn table, an endless belt mounted on the frame and carrying a roller to trip the keeper and to turn the table at predetermined intervals and for a predetermined distance, a barrel supported by the frame and having one of its ends in close proximity to the turn table and in register with the opening therein above the flat spring elements, a pitting plunger movable in the barrel and carrying a circumferentially arranged series of spaced fruit piercing and impinging pitting needles, and means for operating the belt and the plunger in combination with oppositely disposed fruit delivery and pitted fruit directing chutes.

LEO GILGENBACH.